United States Patent [19]

Ramachandran et al.

[11] Patent Number: 5,589,545
[45] Date of Patent: Dec. 31, 1996

[54] LUBRICIOUS POLYMER BLENDS COMPRISING POLYETHYLENE OXIDE, POLYETHYLENE AND A POLYLACTONE

[75] Inventors: Ramesh Ramachandran, North Brunswick; Sharon A. Dinunzi, Middlesex, both of N.J.

[73] Assignee: Union Carbide Chemicals & Plastics Technology Corporation, Danbury, Conn.

[21] Appl. No.: 276,342

[22] Filed: Jul. 18, 1994

[51] Int. Cl.⁶ .............. C08F 8/30; C08L 23/00; C08L 71/02
[52] U.S. Cl. .................... 525/184; 525/187
[58] Field of Search .................... 525/184, 187

[56] References Cited

U.S. PATENT DOCUMENTS

| | | | |
|---|---|---|---|
| 3,850,862 | 11/1974 | Clendinning et al. | 260/7.5 |
| 3,921,333 | 11/1975 | Clendinning et al. | 47/37 |
| 3,929,937 | 12/1975 | Clendinning et al. | 525/190 |
| 4,291,463 | 9/1981 | Williams | 30/346.53 |
| 4,511,687 | 4/1985 | Nakanishi et al. | 525/186 |
| 4,546,147 | 10/1985 | Woodbrey et al. | 525/184 |
| 4,624,051 | 11/1986 | Apprille, Jr. et al. | 30/50 |
| 4,778,640 | 10/1988 | Braun et al. | 264/250 |
| 4,875,287 | 10/1989 | Creasy et al. | 30/34.01 |
| 4,999,183 | 3/1991 | Mackles et al. | 424/47 |
| 5,084,315 | 1/1992 | Karimi et al. | 428/36.6 |
| 5,089,544 | 2/1992 | Ross et al. | 523/511 |
| 5,100,015 | 3/1992 | Havens | 428/516 |
| 5,147,712 | 9/1992 | Miyahara et al. | 525/186 |
| 5,183,861 | 2/1993 | Riffle et al. | 525/415 |
| 5,244,970 | 9/1993 | Kobayashi et al. | 525/63 |

FOREIGN PATENT DOCUMENTS

| | | |
|---|---|---|
| 94144823 | 6/1993 | Austria . |
| 03188142 | 8/1991 | Japan . |
| 04122750 | 4/1992 | Japan . |
| WO16135 | 8/1993 | WIPO . |

OTHER PUBLICATIONS

Polymer Bulletin, Springer–Verlag 1982–7 (Jul.).
TONE[R] Polymers—Biodegradable Plastic Resins, Union Carbide Chemicals and Plastics Company Inc., May 5/1990.

Primary Examiner—John C. Bleutoe
Assistant Examiner—Randy Gulakowski
Attorney, Agent, or Firm—W. K. Volles

[57] ABSTRACT

Molded polymer blends comprising a polyolefin, e.g., polyethylene, a poly(alkylene oxide), e.g., poly(ethylene oxide), and a polylactone, e.g., polycaprolactone, are disclosed. The polymer blends are substantially homogeneous and become lubricious when exposed to water. The polymer blends are suitable for use, for example, in personal care articles such as lubricious strips for razors and in medical articles such as, for example, catheters and probes.

12 Claims, 2 Drawing Sheets

LUBRICIOUS POLYMER BLENDS COMPRISING POLYETHYLENE OXIDE, POLYETHYLENE AND A POLYLACTONE

FIELD IN THE INVENTION

The present invention relates to molded polymer blends. More specifically, the present invention relates to molded polymer blends comprising a polyolefin, poly(ethylene oxide) and a polylactone which become lubricious when exposed to water.

BACKGROUND OF THE INVENTION

Shaving razors often comprise a lubricating strip to reduce friction between the razor and the skin of the person being shaved. The lubricating strips typically comprise a water soluble polymer, which upon exposure to water, begins to dissolve from the lubricating strip thereby reducing friction. It is not uncommon for such lubricating strips to be comprised of a polymer blend of poly(ethylene oxide) and polystyrene. Although such lubricating strips are functionally effective, the use of polystyrene has been viewed by the public to be undesirable due to the presence of an aromatic ring in the styrene and potential styrene emission problems.

Polyethylene is a polymer which does not contain an aromatic ring. Thus polyethylene would be a desirable substitute for polystyrene in such lubricating strips. However, prior to the present invention, molded polymer blends of polyethylene and poly(ethylene oxide) were not compatible, and thus could not readily form a substantially homogeneous blend. As a result, lubricating strips made from polyethylene and poly(ethylene oxide) often have a blotchy appearance, and more importantly, inconsistent lubricity characteristics due to the varying concentrations of poly(ethylene oxide). This characteristic is unacceptable in the marketplace.

Medical articles which are designed for insertion into the body, e.g. catheters, are often comprised of polyolefins, such as, polyethylene or polypropylene which are inherently non-lubricious. Attempts have been made to enhance the lubricity of such products when exposed to water by coextruding the polyolefin substrate material with a hydrophilic polymer blend comprising a water soluble polymer such as, poly(ethylene oxide) and a carrier polymer which can adhere to the polyolefin substrate material, e.g., polyurethane.

Accordingly, in view of the need for lubricious-when-wet articles such as the razor lubricating strips and medical articles described above, improved polymer blends comprising polyolefins, e.g. polyethylene, and poly(alkylene oxides), e.g. poly(ethylene oxide), are desired. Such polymer blends would have utility in a variety of applications where lubricious-when-wet properties are desired.

SUMMARY OF THE INVENTION

By the present invention, improved molded polymer blends which become lubricious when exposed to water are provided. The polymer blends comprise a polyolefin, such as for example, polyethylene or polypropylene, and a poly(alkylene oxide) such as for example, poly(ethylene oxide). The improvement is derived from the addition of a polylactone, such as for example, polycaprolactone, which functions to compatibilize the poly(alkylene oxide) with the polyolefin. The molded polymer blends of the present invention can have a variety of end uses when lubricious-when-wet properties are desired, such as for example, in personal care articles, e.g., lubricious strips for razors, and in medical articles, e.g., catheters.

DETAILED DESCRIPTION OF THE INVENTION

Figure 2:
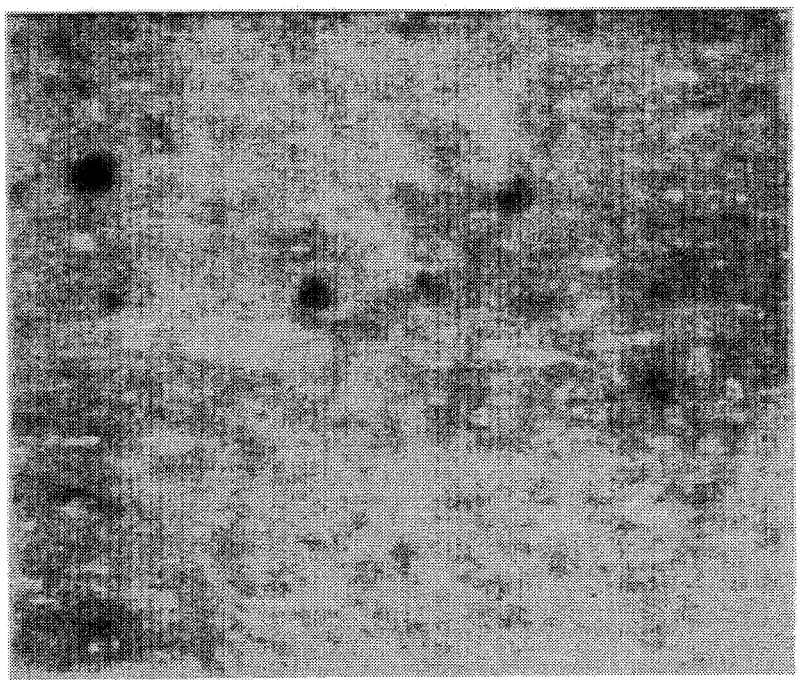
FIG. 2 is a photograph of a polymer blend in accordance with the present invention of polyethylene, poly(ethylene oxide) and polycaprolactone.

The polyolefins suitable for use in accordance with the present invention typically comprise from 2 to about 8, preferably from 2 to about 4, carbon atoms per monomeric molecule. Preferably, the polyolefins are selected from the group consisting of polyethylene and polypropylene, and more preferably, the polyolefin is polyethylene.

The polyolefin polymer can be an olefin homopolymer or a copolymer or a mixture thereof. Preferably, the polyolefin polymers are solid thermoplastic polymers. Typical monomers suitable for preparing the copolymers of the present invention with the primary olefin monomer, e.g., ethylene, include alpha-olefins, halogenated olefins, vinyl and vinylidene halides, acrylic and alpha-alkyl acrylic acids, and the esters amides, and nitriles thereof, maleic and fumaric acids and their anhydrides and alkyl esters, vinyl alkyl ethers and ketones, dienes and the like. Preferably, such copolymers contain at least about 50 weight percent of the primary olefin monomer and more preferably, from about 80 to 99 weight percent of the primary olefin monomer with the remainder comprising the comonomer.

Preferred polyethylene polymers include both high and low density polyethylenes; ethylene/alkyl 2-alkenoate copolymers, such as ethylene/ethyl acrylate copolymer, ethylene/ethyl methacrylate copolymer; ethylene/vinyl alkanoate copolymers, such as ethyl/vinyl acetate, ethylene/propylene/ethylidenenorbornene copolymer; and the like.

Preferably, the density of polyethylene polymer used in accordance with the present invention is from about 0.9 to 0.94 grams/cubic centimeter ("gm/cc") with a melt flow rate of from about 18 to 35 grams/10 minutes. More preferably, the density is about 0.92 to 0.93 gm/cc and the melt flow is about 20 to 28 grams/10 minutes. Methods for determining the density and melt flow rate are known to those skilled in the art, and include for example, the methods described by the American Society of Testing and Materials.

Typically, the concentration of the polyethylene polymer in the polymer blends of the present invention ranges from about 20 to 80 weight percent, and preferably from about 40 to 60 weight percent, based on the total weight of the polymer blend.

The average particle size of the polyethylene polymer is not critical to the present invention, but is preferably from about 0.01 microns to 1000 microns and more preferably from 50 microns to 250 microns.

Polyolefins, such as for example polyethylene, suitable for use in accordance with the present invention are available from Union Carbide Corporation, Danbury, Ct. Further details concerning the polyolefin polymers suitable for use in accordance with the present invention are known to those skilled in the art.

The poly(alkylene oxide) polymers suitable for use in accordance with the present invention typically comprise from 2 to about 4 carbon atoms per monomeric molecule. Ethylene oxide and propylene oxide monomers are preferred.

The preferred poly(ethylene oxide) polymers of the present invention are ethylene oxide polymers which are water-soluble. The ethylene oxide polymers include, for example, homopolymers of ethylene oxide and copolymers of ethylene oxide with one or more polymerizable olefin oxide comonomers. The particular comonomer, when used in accordance with the present invention, is not critical and may contain hydrocarbon substituents such as alkyl, cycloalkyl, aromatic, alkene and branched alkyl groups. However, the amount of comonomer, e.g., 1,2-propylene oxide, must not exceed that which would cause the poly(ethylene oxide) to become insoluble in water. Typical olefin oxide comonomers include 1,2-propylene oxide, 2,3-butylene oxide, 1,2-butylene oxide, styrene oxide, 2,3-epoxy hexane, 1,2-epoxy octane, butadiene monoxide, cyclohexene monoxide, epichlorohydrin, and the like.

Preferably the poly(ethylene oxide) polymer has a molecular weight from about 200,000 to 4,000,000, more preferably from about 400,000 to 2,000,000 and most preferably from about 500,000 to 1,000,000 grams/gram mole. As used herein the term "molecular weight" refers to average molecular weight. Methods for determining the weight average molecular weight are known to those skilled in the art, and include for example, the method known as low angle light scattering.

Typically, the concentration of the poly(ethylene oxide) polymer in the polymer blends of the present invention ranges from about 15 to 75 weight percent, and preferably from about 25 to 50 weight percent, based upon the total weight of the polymer blend.

The average particle size of the poly(ethylene oxide) polymer is not critical to the present invention, but is typically from about 0.01 microns to 1000 microns and preferably from about 50 microns to 150 microns.

Poly(alkylene oxides), such as for example poly(ethylene oxide), suitable for use in accordance with the present invention are available from Union Carbide Corporation, Danbury, CT. Further details concerning the poly(alkylene oxide) polymers suitable for use in accordance with the present invention are known to those skilled in the art.

The polylactone polymer of the present invention includes any polymer which contains a lactone monomer represented from the formula

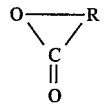

where R is either a divalent hydrocarbon group having from two to twelve carbon atoms or an ester-containing group having from two to twenty carbon atoms.

Illustrative of such lactones are beta-priopiolactone (oxetane-2-one) and its alpha- and beta-substituted derivatives; gamma-butylrolactone (oxolane-2-one), ethylene carbonate (1,3-dioxolane-2one) and their simple alkyl and benzo derivatives; d-valeralactone (oxane-2-one); 1,4-dioxane-2-one; 1,4-thioxane-3-one; ethylene oxalate (1,4-dioxane-2,3-dione); trimethylene carbonate (1,3-dioxane-2-one); and e-caprolactone (oxepane-2-one). One preferred lactone is e-caprolactone (oxepane-2-one). Methods for polymerizing such lactones are known to those skilled in the art.

A preferred polylactone suitable for use in accordance with the present invention is polycaprolactoneo Preferably, the polylactone has a molecular weight from about 30,000 to 70,000 grams/gram mole.

The concentration of the polylactone polymer in the polymer blends of the present invention typically ranges from about 5 to 30 weight percent, and preferably from about 7 to 15 weight percent, based on the total weight of polymer blend.

The average particle size of the polylactone polymer is not critical to the present invention, but is preferably from about 0.1 microns to 1000 microns and more preferably from about 50 to 250 microns.

Polylactones, such as for example polycaprolactone, suitable for use in accordance with the present invention are available from Union Carbide Corporation, Danbury, Ct. Further details concerning the polylactone polymers suitable for use in accordance with the present invention are known to those skilled in the art.

The polymer blends of the present invention may comprise other additives known to those skilled in the art. For example, the polymer blends may comprise additives to enhance the biodegradability of the polymer blend, e.g., catalysts or other chemical compounds, as well as common additives, such as for example, plasticizers, fillers, pigments, slip agents, antistats, antiblocks, antifogs, and the like.

Preferably, in accordance with the present invention, the polymer blends comprise less than about 5 weight percent polystyrene and more preferably are substantially free of polystyrene, i.e., less than about 1 weight percent, based on the total weight of the polymer blend.

Further details concerning the polymers and additives described above, which comprise the polymer blends of the present invention, including without limitation, preparation procedures, commercial availability, handling, storage, use, and the like, are known to those skilled in the art.

The polymer blends of the present invention can be manufactured by any known technique. One preferred method for manufacturing the polymer blends of the present invention is by the extrusion molding of the polymers at a temperature of from about 250 to 500° F., and a pressure of from about _7000 to 20,000 psig. Preferably, the extrudate is cut into pellets of the desired particle size. Typically, the particle size of the cut extrudate ranges from about 1/16 inch to 1/4 inch in diameter. Further details concerning the processes and equipment suitable for manufacturing the polymer blends of the present invention are known to those skilled in the art.

The polymer blends of the present invention have a variety of end uses where lubricious-when-wet properties are desired. As used herein, the term "lubricious-when-wet" refers to a reduction in the coefficient of friction of the molded polymer blend upon exposure to water. Typical end uses for the polymer blends include for example, personal care applications, such as, for example, lubricating strips for razors and products for feminine hygiene, and medical care products, such as, for example, catheters and probes. Typically, such end use articles are made by injection molding, the details of which is known to those skilled in the art.

The following examples are provided for illustrative purposes and are not intended to limit the scope of the claims which follow:

The following ingredients were used in the examples.

PE—A polyethylene homopolymer having a density from 0.9 to 0.94 gm/cc with a melt flow rate of 17 to 34 grams/10 minutes available from Rexene Corporation, Dallas, Tex., sold as REXENE™ 2053.

PEG—A polyethylene glycol polymer having a molecular weight of about 600 grams/gram mole, available from Union Carbide Corporation, Danbury, Ct., sold as PEG-600.

PEO1—A poly(ethylene oxide) polymer having a molecular weight of about 300,000 grams/gram mole available from Union Carbide Corporation, Danbury, Ct., sold as Polyox®N-3000.

PEO2—A poly(ethylene oxide) polymer having a molecular weight of about 4,000,000 grams/gram mole available from Union Carbide Corporation, Danbury, Ct., sold as Polyox™ WSR-301.

PEO3—A poly(ethylene oxide) polymer having a molecular weight of about 600,000 grams/gram mole available from Union Carbide Corporation, Danbury, Ct., sold as Polyox™ WSR-205.

PCL—a polycaprolactone polymer having a molecular weight of from about 35,000 to 55,000 grams/gram mole available from Union Carbide Corporation, Danbury Ct. and sold as PCL-767.

CONTROL EXAMPLE 1

This example describes the preparation of a polymer blend containing polyethylene and poly(ethylene oxide).

2030 grams of PE, 22.6 grams of PEG and 215.4 grams of PEO3 were mixed in a Henschel mixer. The Henschel mixer is a mixing device that provides intense contact between the components added to the mixing chamber similar to what might be observed in a Waring blender. The mixer was operated at 1400 rpm for two minutes. The blend of PE and PEO3 was injection molded in a Van Dorn 8 Oz. 200 ton machine into 1/16 inch thick, 6 inches by 6 inches square plaques. The melt temperature of the injection molding machine was around 380° to 420° F.

The injection molded plaque was photographed at a magnification of 8× (eight times) using a microscope and camera made by Wild Heerbrugg, Heerbrugg, Switzerland, Model No. M420. A polaroid picture of the photograph is shown as FIG. 1.

Figure 1:
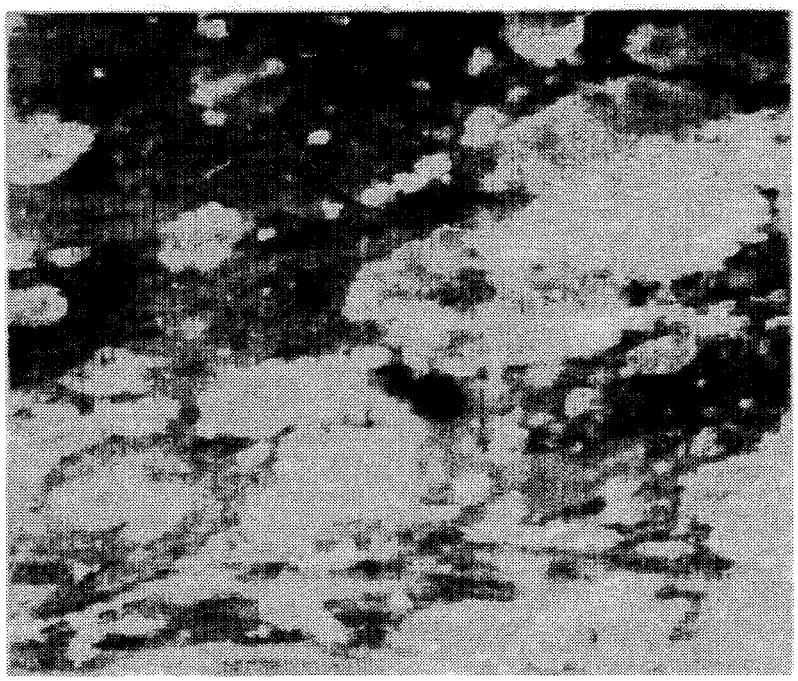
FIG. 1 is a photograph for comparative purposes of a polymer blend of polyethylene and poly(ethylene oxide).

It can be seen from FIG. 1 that the photograph of the polymer blend containing polyethylene and poly(ethylene oxide) is very biotchy and not homogeneous. This appearance is unacceptable both for aesthetic reasons and for functionality, since the varying concentration of poly(ethylene oxide) throughout the polymer blend can cause inconsistencies in the lubricity characteristics of the polymer blend. Increasing the concentration of Polyethylene Oxide in this formulation would even make the compatibility problems worse.

EXAMPLE 2

This example describes the preparation of a polymer blend containing polyethylene, poly(ethylene oxide) and polycaprolactone. 1070 grams of PE, 544 grams of PEO3, 18 grams of PEG and 181 grams of PCL were mixed in a Henschel mixer at 1400 rpm for about two minutes. The mixed product was pelletized and injection molded using the same injection molding machine and conditions described in Example 1. The molded plaque was 1/16 inch thick and 6"×6" square.

FIG. 2 illustrates that quite surprisingly, upon the addition of the polycaprolactone, the polymer blend was rendered substantially homogeneous. This represents a significant enhancement over the polymer blend described in Example 1. As a result of this substantial enhancement homogeneity, the polymer blend of Example 2 has both a more aesthetically pleasing appearance which will result in more consistent lubricity characteristics.

EXAMPLE 3

This example describes the surface lubricity characteristics of different molded polymer blends.

A Bohlin VOR rheometer manufactured by Bohlin Instruments, N.J., was used to measure surface lubricity of the injection molded parts. A cone and plate attachment was utilized. One inch diameter discs were cut out from the injection molded plaques and three drops of water from a drop pipette were added to the surface. The cone on top was brought into contact with the disc. The disc was then oscillated at a frequency of 1 Hz to simulate the motion of a hand across the disc. The resistance to motion was measured in viscosity numbers by the torsion bar on the cone. The higher the viscosity, the greater the friction between the surface.

Figure 3:
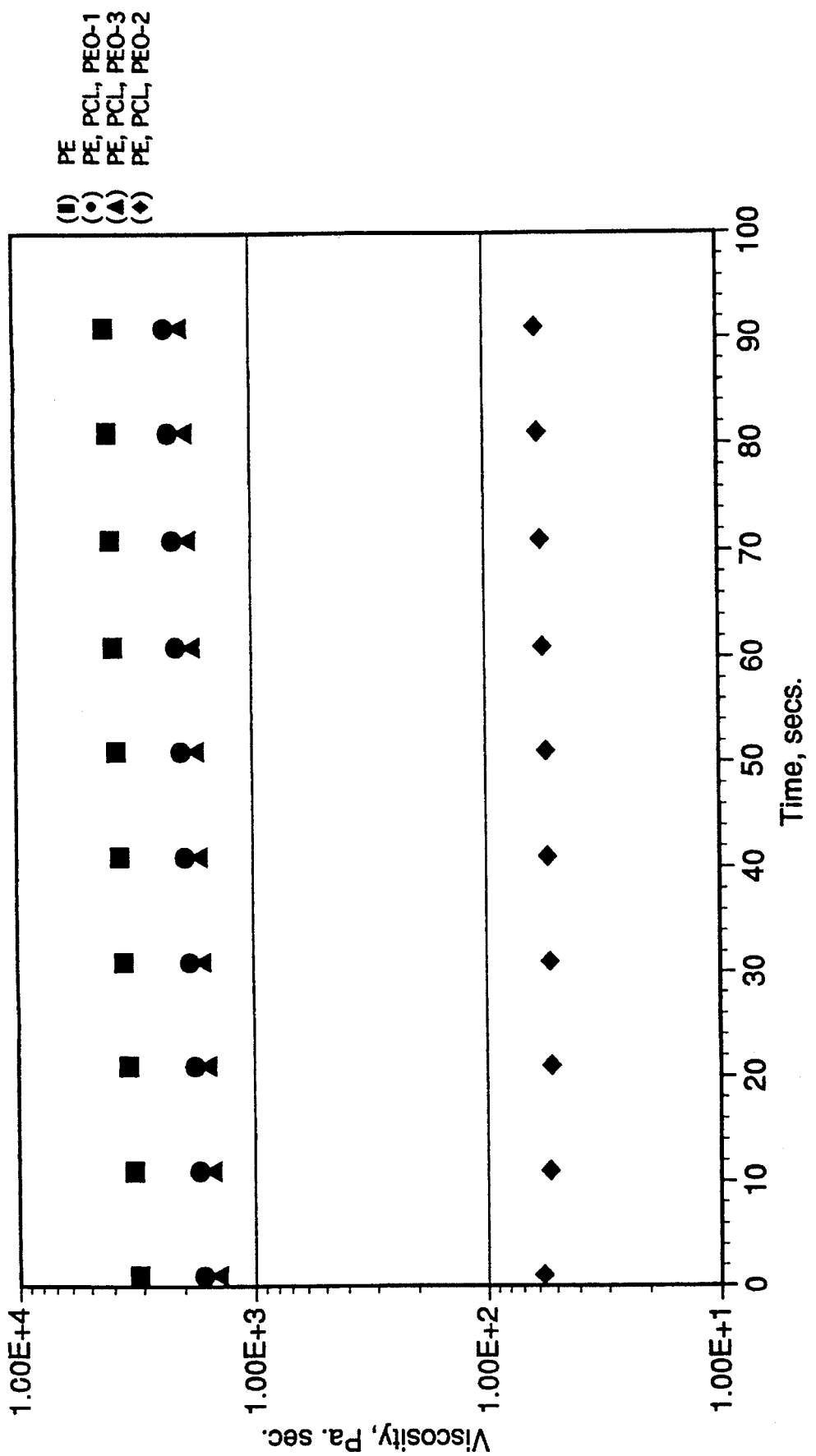
FIG. 3 is a graph that shows the increase in lubricity to a polyethylene surface due the addition of poly(ethlyene oxide) in accordance with the present invention.

FIG. 3 illustrates the effect of poly(ethylene oxide) in reducing the viscosity (which translates into increased lubricity) of the injection molded article. It is clear that the addition of the poly(ethylene oxide) reduced the surface viscosity of the wetted PE/PCL surface. As the molecular weight of poly(ethylene oxide) was increased, the lubricity increased. FIG. 3 shows that the lubricity due to addition of poly(ethylene oxide) increases in the order PEO2 >PEO3 >PEO1. Maximum reduction in viscosity or highest lubricity was obtained using PEO2 with a molecular weight of 4,000,000. It was also clear by visual observation, however, that the PEO2 provided a somewhat tacky appearance as compared to the other samples.

EXAMPLE 4

This example describes the effect of the molecular weight of the poly(ethylene oxide) on the lubricity characteristics of the polymer blend.

Three plaques that contained PE, poly(ethylene oxide) and PCL in the ratio 60:30:10 by weight were chosen for evaluation. A panel of people was asked to wet the surface of each of these plaques and describe the slip and tackiness of the surface. A number was assigned to their reaction on the extent of slip and tack. High slip with low tack were the desired goal.

Table 1 below sets forth the results of the panel tests.

TABLE 1

| | Panel Test Results | |
|---|---|---|
| Polymer | Slip | Tack |
| PEO1 | 20 | 20 |
| PEO2 | 85 | 90 |
| PEO3 | 80 | 10 |

From the data set forth in Table 1, it can be seen that PEO1 provided relatively low values for slip and tack, i.e., 20 for both. In general, it is desirable to obtain a high slip value and a low tack value. High slip values are indicative of enhanced lubricity and low tack values are indicative of a non-tacky feel. In contrast, PEO2 provided high values for both slip and tack, i.e., 85 and 90 respectively. However, quite surprisingly, PEO3 provided a value of 80 for slip and a value of 10 for tack. This performance was both surprising and unexpected.

Although the present invention has been described with respect to specific aspects, those skilled in the art will recognize that other aspects which are not specifically described, are intended to be included within the scope of the claims which follow. Such other aspects include, for example, the use of polyethylene, poly(ethylene oxide) or polylactone polymers which are not specifically described herein.

We claim:

1. A molded polymer blend comprising:
   (a) from about 40 to 70 weight percent polyethylene;
   (b) from about 25 to 50 weight percent poly(ethylene oxide); and
   (c) from about 5 to 35 weight percent of a polylactone; wherein
   (i) said poly(ethylene oxide) has a weight average molecular weight of from about 500,000 to 1,000,000 grams per gram mole;
   (ii) said polymer blend exhibits a reduction in the coefficient of friction upon exposure to water; and
   (iii) said polymer blend is substantially homogeneous.

2. The polymer blend of claim I wherein the polyethylene has a density from 0.92 to 0.93 gm/cc.

3. The polymer blend of claim 1 wherein the polyethylene has a melt flow rate of 19 to 30 grams/ten minutes.

4. The polymer blend of claim 1 wherein the polylactone has a weight average molecular weight of from about 35,000 to 50,000 grams per gram mole.

5. The polymer blend of claim I wherein the polylactone is polycaprolactone.

6. The polymer blend of claim 1 comprising from about 40 to 60 weight percent polyethylene.

7. The polymer blend of claim 1 comprising from about 7 to 15 weight percent polylactone.

8. The polymer blend of claim I wherein said blend is substantially homogeneous.

9. The polymer blend of claim 1 comprising less than about 1 weight percent polystyrene.

10. A molded polymer blend comprising:
    (a) from about 40 to 70 weight percent polyethylene;
    (b) from about 25 to 50 weight percent poly(ethylene oxide); and
    (c) from about 5 to 35 weight percent polycaprolactone, wherein:
    (i) said polyethylene has a density of from 0.9 to 0.94 gm/cc and a melt flow rate of 17 to 34 grams/ten minutes;
    (ii) said poly(ethylene oxide) has a weight average molecular weight of about 500,000 to 1,000,000 grams/gram mole;
    (iii) said polycaprolactone has a weight average molecular weight of from about 35,000 to 55,000 grams/gram mole;
    (iv) said polymer blend exhibits a reduction in the coefficient of friction upon exposure to water; and
    (v) said polymer blend is substantially homogeneous.

11. A molded polymer blend comprising:
    (a) about 60 weight percent polyethylene;
    (b) about 30 weight percent poly(ethylene oxide); and
    (c) about 10 weight percent polycaprolactone; wherein:
    (i) said polyethylene has a density of from 0.9 to 0.94 gm/cc and a melt flow rate of 17 to 34 grams/ten minutes;
    (ii) said poly(ethylene oxide) has a weight average molecular weight of about 500,000 to 1,000,000 grams/gram mole;
    (iii) said polycaprolactone has a molecular weight of from about 35,000 to 55,000 grams/gram mole;
    (iv) said polymer blend exhibits a reduction in the coefficient of friction upon exposure to water; and
    (v) said polymer blend is substantially homogeneous.

12. The polymer blend of claim 11 wherein the poly(ethylene oxide) has a weight average molecular weight of about 600,000 grams per gram mole.

* * * * *